United States Patent
Sparks et al.

(10) Patent No.: US 10,271,520 B2
(45) Date of Patent: Apr. 30, 2019

(54) PET COLLAR HAVING A THERAPEUTIC DELIVERY DEVICE AND METHOD THEREFOR

(71) Applicants: David Sparks, Tempe, AZ (US); Colin Brodie, Tempe, AZ (US)

(72) Inventors: David Sparks, Tempe, AZ (US); Colin Brodie, Tempe, AZ (US)

(73) Assignee: 21ST CENTURY ANIMAL HEALTHCARE, INC., Tempe, AZ (US)

( * ) Notice: Subject to any disclaimer, the term of this patent is extended or adjusted under 35 U.S.C. 154(b) by 185 days.

(21) Appl. No.: 15/397,475

(22) Filed: Jan. 3, 2017

(65) Prior Publication Data

US 2018/0184619 A1    Jul. 5, 2018

(51) Int. Cl.
| | |
|---|---|
| *A01K 13/00* | (2006.01) |
| *A01K 15/04* | (2006.01) |
| *A44B 18/00* | (2006.01) |
| *A01K 27/00* | (2006.01) |

(52) U.S. Cl.
CPC ............ *A01K 15/04* (2013.01); *A01K 13/006* (2013.01); *A01K 27/008* (2013.01); *A44B 18/00* (2013.01)

(58) Field of Classification Search
CPC ......... A01K 15/04; A01K 27/008; A61F 7/02; A61F 2007/0011
See application file for complete search history.

(56) References Cited

U.S. PATENT DOCUMENTS

| | | | | |
|---|---|---|---|---|
| 3,477,409 A | * | 11/1969 | Costanzo | A01K 27/007 119/174 |
| 3,814,061 A | * | 6/1974 | Aries | A01K 13/00 119/654 |
| 4,476,814 A | | 10/1984 | Miller | |
| 4,763,604 A | * | 8/1988 | Meekins | A01K 13/003 119/28.5 |
| 5,148,949 A | | 9/1992 | Luca | |
| 5,233,942 A | | 8/1993 | Cooper et al. | |
| 5,465,689 A | * | 11/1995 | Winder | A01K 13/003 119/654 |
| 6,016,573 A | | 1/2000 | Olson | |
| 6,101,981 A | | 8/2000 | Friend et al. | |

(Continued)

FOREIGN PATENT DOCUMENTS

CA    2496220 A1    8/2006

OTHER PUBLICATIONS

Bonnie Mioduchoski Pet Collar Sachets Relieve Shelter Stress http://www.prweb.com/releases/2004/11/prweb181693.htm.

*Primary Examiner* — Kristen C Hayes
(74) *Attorney, Agent, or Firm* — Weiss & Moy, P.C.; Jeffrey D. Moy

(57) ABSTRACT

A medical pet collar has a collar for positioning around a neck of an animal. The collar prevents the animal from biting and licking a body of the animal. A pocket is formed on the collar. The pocket has at least one side that is removably coupled to the collar. The at least one side that is removably coupled to the collar allows for different therapeutic delivery patches to be stored within the pocket. The pocket is configured to provide air transfer capabilities to allow the animal to smell the contents of a therapeutic delivery patch stored within the pocket and to prevent the animal from reaching the therapeutic delivery patch.

9 Claims, 4 Drawing Sheets

(56) References Cited

U.S. PATENT DOCUMENTS

| | | | |
|---|---|---|---|
| 6,972,029 B2* | 12/2005 | Mayrhofer | A61F 7/02 |
| | | | 607/108 |
| 7,125,417 B2* | 10/2006 | Mizrahi | A61K 36/28 |
| | | | 607/114 |
| 7,427,417 B2* | 9/2008 | Jendrucko | A61K 8/02 |
| | | | 424/725 |
| 7,878,155 B2* | 2/2011 | Winestock | A01K 13/006 |
| | | | 119/814 |
| 8,739,741 B2* | 6/2014 | Groff | A61D 9/00 |
| | | | 119/815 |
| 9,307,842 B2* | 4/2016 | Gibbons | A47C 20/025 |
| 2005/0207982 A1* | 9/2005 | Jendrucko | A61K 8/02 |
| | | | 424/40 |
| 2007/0271703 A1* | 11/2007 | Matthews Brown | A47D 13/08 |
| | | | 5/636 |
| 2009/0241855 A1 | 10/2009 | Stocki et al. | |
| 2010/0192871 A1 | 8/2010 | Winestock | |
| 2013/0055968 A1 | 3/2013 | Lippincott | |
| 2014/0096722 A1 | 4/2014 | Groff | |

\* cited by examiner

PET COLLAR HAVING A THERAPEUTIC DELIVERY DEVICE AND METHOD THEREFOR

TECHNICAL FIELD

The present application in general relates to a pet collar, and more specifically, to a pet collar that prevents an animal from pulling and/or licking its stitches and/or bandages and which houses a therapeutic delivery device to reduce anxiety and help the pet relax from having to wear said pet collar.

BACKGROUND

Animals such as dogs and cats are very popular as pets. Unfortunately, when dogs and cats sustain an injury or undergo surgery, they make for difficult patients. Many dogs and cats have a tendency to tear out their stitches after surgery, rip off their bandages, lick and/or chew their infected body parts, and the like.

In order to prevent an animal from licking, scratching, and/or biting an injured area on its body, a pet cone or an Elizabethan collar (hereinafter pet cone) may be worn by the animal. A pet cone is a protective medical device worn by the animal. The pet cone is generally a semicircle piece of material that forms a cone when secured around the animal's neck. Materials such as a stiff fabric or plastic material may be used to form the pet cone. Alternatively, an inflatable pouch secured inside a fabric cover that wraps around the animals neck may be used. By securing the pet cone around the neck of the animal, the design and shape of the pet cone prevents the animal from biting and/or licking its body/head where the wound or injury is located allowing the wound/injury to heal.

Use of these pet cones may be a stressful event for many animals. The stress may cause some animals to stop eating, have difficulty in sleeping as well as cause other abnormal behavior. These events may cause stress and concern to the animal owners who use the pet cones on their pet.

Therefore, it would be desirable to provide a system and method that overcomes the above.

SUMMARY

In accordance with one embodiment, a medical pet collar is disclosed. The medical pet collar has a collar for positioning around a neck of an animal. The collar prevents the animal from biting and licking a body of the animal. A pocket is formed on the collar. The pocket has at least one side that is removably coupled to the collar. The at least one side that is removably coupled to the collar allows for different therapeutic delivery patches to be stored within the pocket. The pocket is configured to provide air transfer capabilities to allow the animal to smell the contents of a therapeutic delivery patch stored within the pocket and to prevent the animal from reaching the therapeutic delivery patch.

In accordance with one embodiment, a medical pet collar is disclosed. The medical pet collar has a cone structure for positioning around a neck of an animal. The cone structure prevents the animal from biting and licking a body of the animal. A pocket is formed on the cone structure. The pocket has at least one side that is removably coupled to the cone structure. The at least one side that is removably coupled to the cone structure allowing for different therapeutic delivery patches to be stored within the pocket. The pocket is configured to provide air transfer capabilities to allow the animal to smell the contents of a therapeutic delivery patch stored within the pocket and to prevent the animal from reaching the therapeutic delivery patch.

BRIEF DESCRIPTION OF THE DRAWINGS

The present application is further detailed with respect to the following drawings. These figures are not intended to limit the scope of the present invention but rather illustrate certain attributes thereof.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
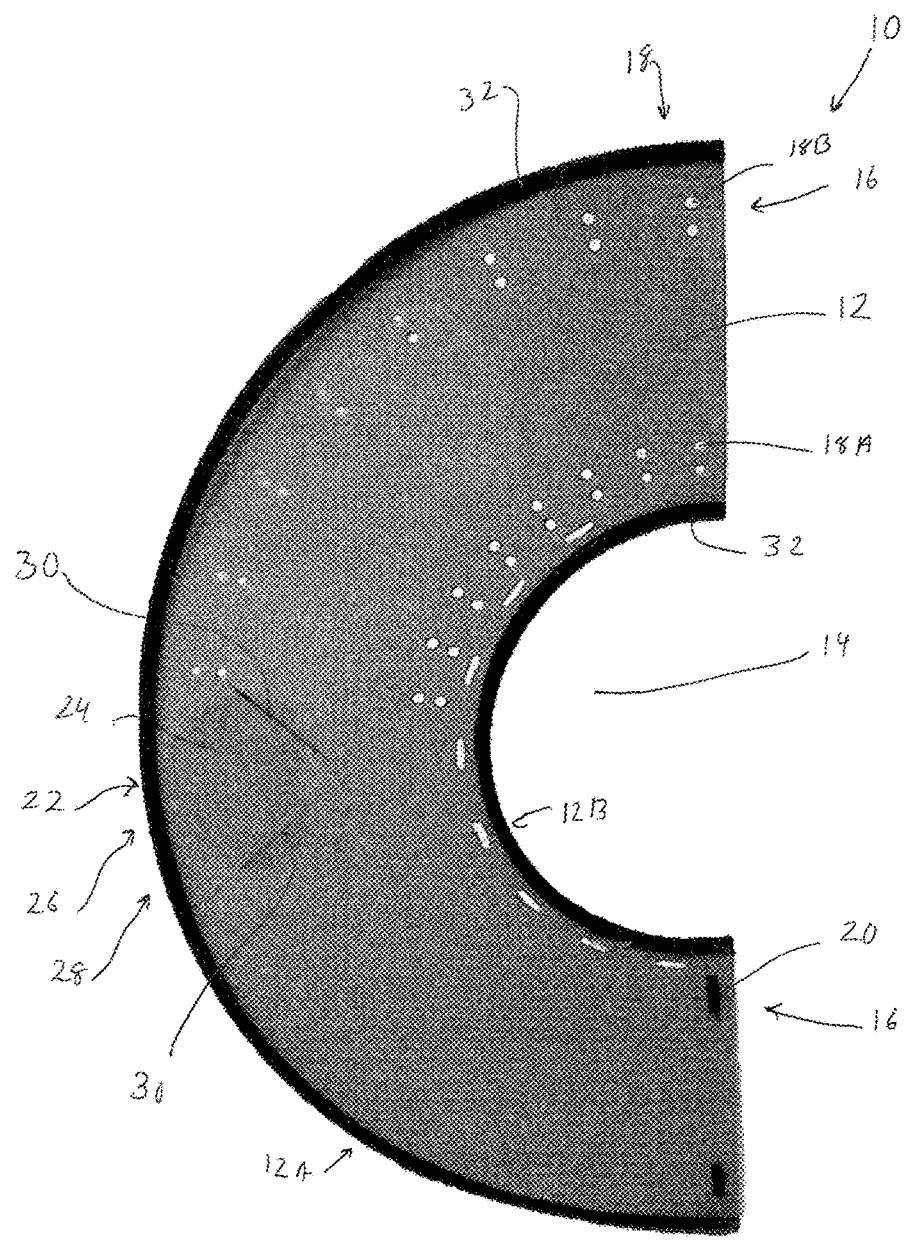
FIG. 1 is a diagram of an exemplary pet cone according to one aspect of the present application.
Figure 2:
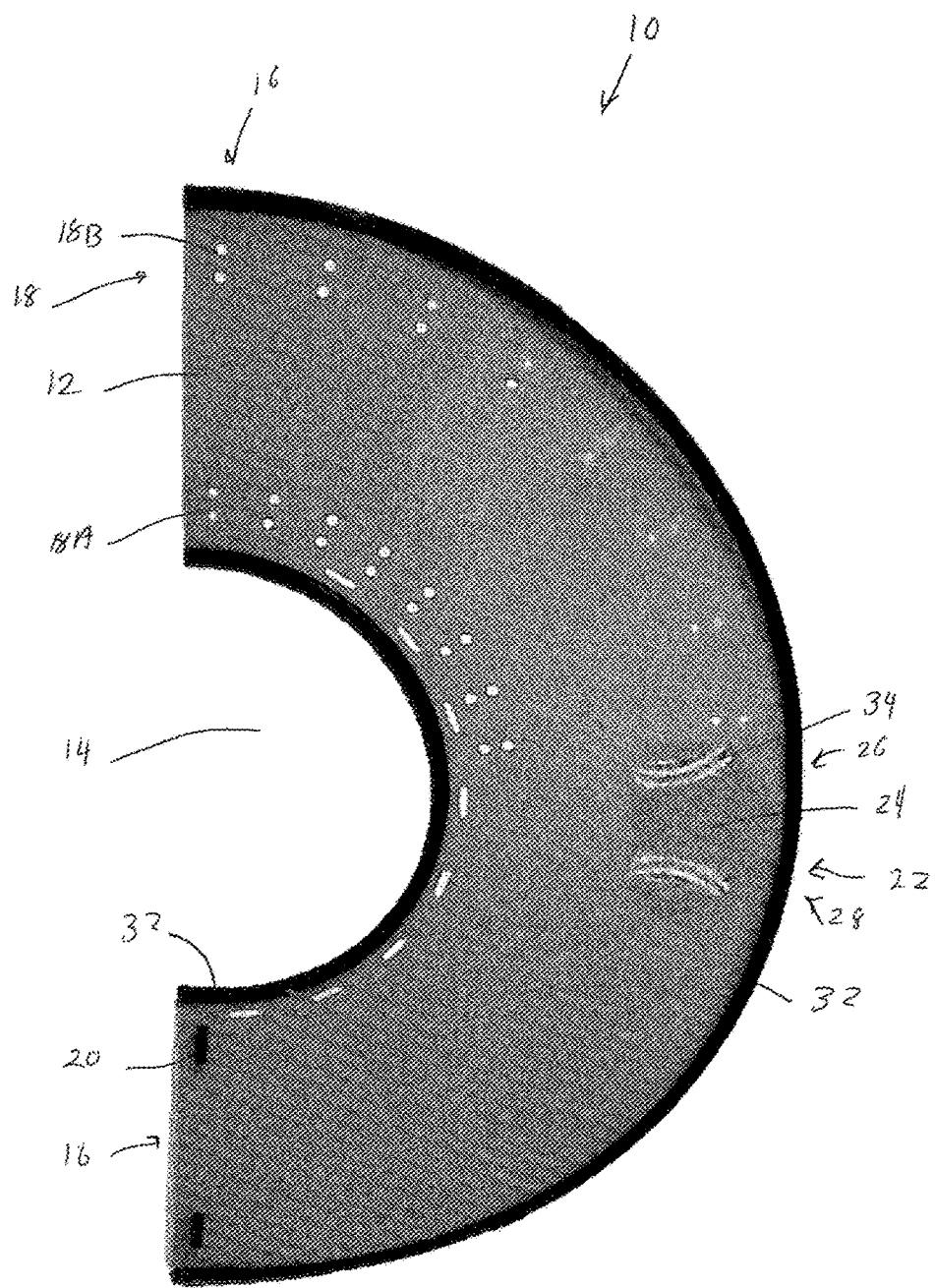
FIG. 2 is a diagram of an exemplary pet cone according to one aspect of the present application.

Embodiments of the exemplary system and method relates to a pet collar that prevents an animal from pulling and/or licking its stitches and/or bandages and which houses a therapeutic delivery device to reduce anxiety and stress related behaviors, and help the pet relax from having to wear said pet collar. Referring to FIGS. 1-2, a pet cone 10 may be seen. The pet cone 10 may be formed of a semicircle piece 12. The semicircle piece 12 may be formed of a semi-rigid material such as plastic or the like. The above is given as an example and should not be seen in a limiting manner. A semicircular cutout 14 is formed in a top central area of the semicircle piece 12.

A neck of an animal may be positioned within the semicircular cutout 14. The semicircle piece 12 is placed around the neck to form a cone when secured around the animal's neck.

The semicircle piece 12 may have a securing mechanism 16 formed thereon. The securing mechanism 16 may allow one to secure and hold the pet cone 10 around the animal's neck. In accordance with one embodiment, the securing mechanism 16 may have a plurality of openings 18 formed through the semicircle piece 12. The openings 18 may be formed along a side edge of the semicircle piece 12. The openings 18 may be aligned such that a first pair of openings 18A may be formed in an upper section and a second pair of openings 18B may be formed in a lower section. The first pair of openings 18A may be aligned with the second pair 18B. A connector 20 may be formed on an opposing side edge of the semicircle piece 12 from the openings 18. The connector 20 may be used to engage with the openings 18 to secure the opposing ends of the semicircle piece 12 together forming the cone. In accordance with one embodiment, a pair of connectors 20 may be used wherein one connector 20 may engage the first pair of openings 18A and a second connector 20 may engage the second pair of openings 18B.

A plurality of vent holes 22 may be formed through a central bottom section of the semicircle piece 12. The vent holes 22 may be positioned proximate a nose of the animal when the pet cone 10 is secured around the neck of the animal. A holding plate 24 may be secured across the vent holes 22. The holding plate 24 may be secured to an exterior surface of the semicircle piece 12 wherein the exterior surface may be a surface emanating out and away from the animal when the pet cone 10 is secured around the neck of the animal. The holding plate 24 may form a pocket 26 for securing and holding a therapeutic delivery patch 28 within the pocket 26. The pocket 26 may prevent the animal from reaching the therapeutic delivery patch 28.

The holding plate 24 may be removably secured to the exterior surface of the semicircle piece 12 in different manners. In the embodiment shown in FIG. 1, a pair of slits 30 is formed through the semicircle piece 12. The slits 30 may be formed on opposing sides of the vent holes 22 (i.e., left side and right side, top side and bottom side). Opposing sides (i.e., left side and right side, top side and bottom side) of the holding plate 24 may be placed through the slits 30 securing the holding plate 24 to the exterior surface of the semicircle piece 12.

The therapeutic delivery patch 28 may then be placed within the pocket 26 formed between the holding plate 24 and the semicircle piece 12. The plurality of vent holes 22 may provide air transfer capabilities to allow the animal to smell the contents of the therapeutic delivery patch 28. The removability of the holding plate 24 may allow different therapeutic delivery patch 28 to be placed within the pocket 26 depending on the needs of the animal.

A trim 32 may be placed around an outer 12A and inner 12 edges of the semicircle piece 12. The trim 32 may be used to cover the edges 12A and 12B to prevent the animal and/or others from getting hurt if the edges 12A and 12B.

In accordance with another embodiment, as shown in FIG. 2, the holding plate 24 may be removably secured to the exterior surface of the semicircle piece 12 by using an attachment device 34. The attachment device 34 may be double sided tape. Alternatively, hook and loop material may be used on the holding plate 24 and the exterior surface of the semicircle piece 12. The above is given as examples and should not be seen in a limiting manner.

Like the embodiment shown in FIG. 1, the therapeutic delivery patch 28 may then be placed within the pocket 26 formed between the holding plate 24 and the semicircle piece 12. The plurality of vent holes 22 may provide air transfer capabilities to allow the animal to smell the contents of the therapeutic delivery patch 28. The removability of the holding plate 24 may allow different therapeutic delivery patch 28 to be placed within the pocket 26 depending on the needs of the animal.

Figure 3:
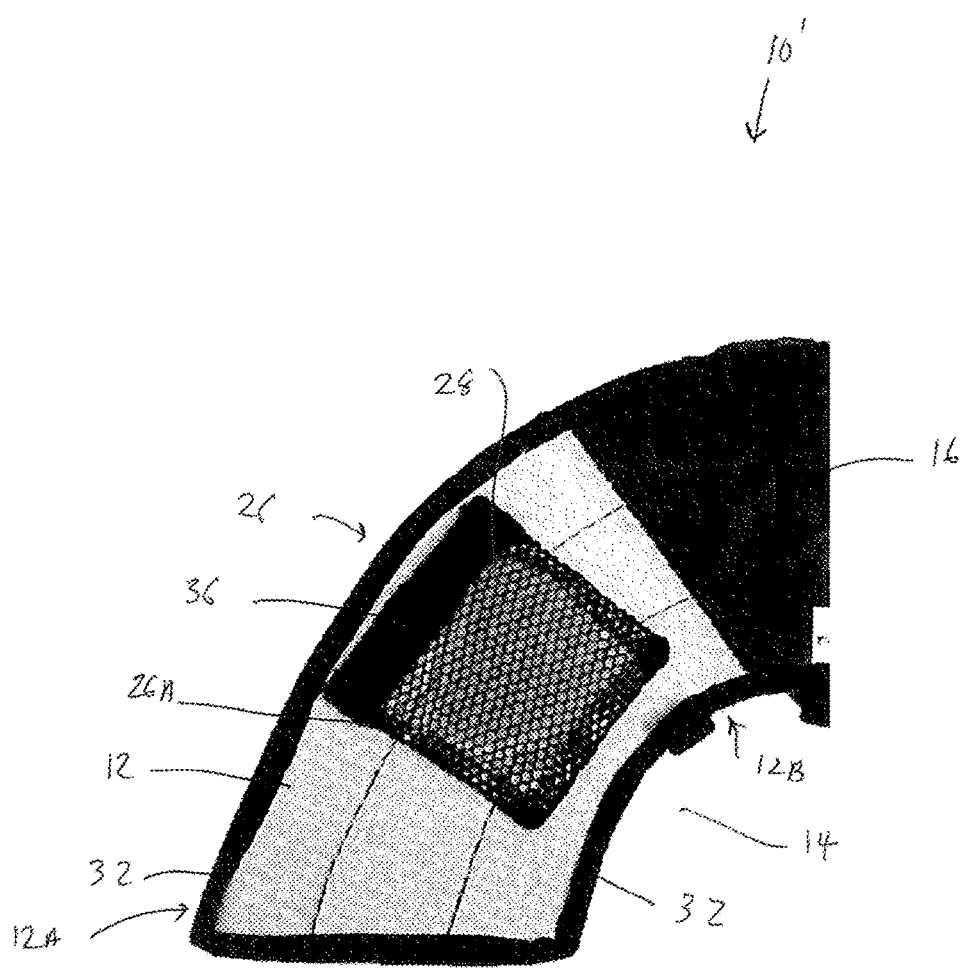
FIG. 3 is a diagram of an exemplary pet cone according to one aspect of the present application.

Referring to FIG. 3, another embodiment of the pet cone 10' may be seen. The pet cone 10" may be formed of a semicircle piece 12. The semicircle piece 12 may be formed of a semi-rigid material. In the present embodiment, a semi-rigid fabric material may be used. The above is given as an example and should not be seen in a limiting manner. A semicircular cutout 14 is formed in a top central area of the semicircle piece 12.

A neck of an animal may be positioned within the semicircular cutout 14. The semicircle piece 12 is placed around the neck to form a cone when secured around the animal's neck.

The semicircle piece 12 may have a securing mechanism 16 formed thereon. The securing mechanism 16 may allow one to secure and hold the pet cone 10 around the animal's neck. In accordance with one embodiment, the securing mechanism 16 may be hook and loop material 16A.

In the present embodiment, the pocket 26 may be formed by securing a mesh material 26A to an interior surface 12C of the semicircle piece 12. At least one side of the mesh material 26A may be removably secured to the interior surface 12C of the semicircle piece 12. In accordance with one embodiment, a hook and loop material 36 may be used to removably secure at least one side of the mesh material 26A to the interior surface 12C. The remaining sides of the mesh material 26A may be permanently secured to the interior surface 12C. For example, the remaining sides may be sewn to the interior surface 12C.

By disengaging the at least one side of the mesh material 26A that is removably secured to the interior surface 12C of the semicircle piece 12 an individual may insert different therapeutic delivery patches 28 within the pocket 26 formed by the mesh material 26A. The mesh material 26A may provide air transfer capabilities to allow the animal to smell the contents of the therapeutic delivery patch 28. The pocket 26 may prevent the animal from reaching the therapeutic delivery patch 28.

A trim 32 may be placed around an outer 12A and inner 12B edges of the semicircle piece 12. The trim 32 may be used to cover the edges 12A and 12B to prevent the animal and/or others from getting hurt if the edges 12A and 12B.

Figure 4:
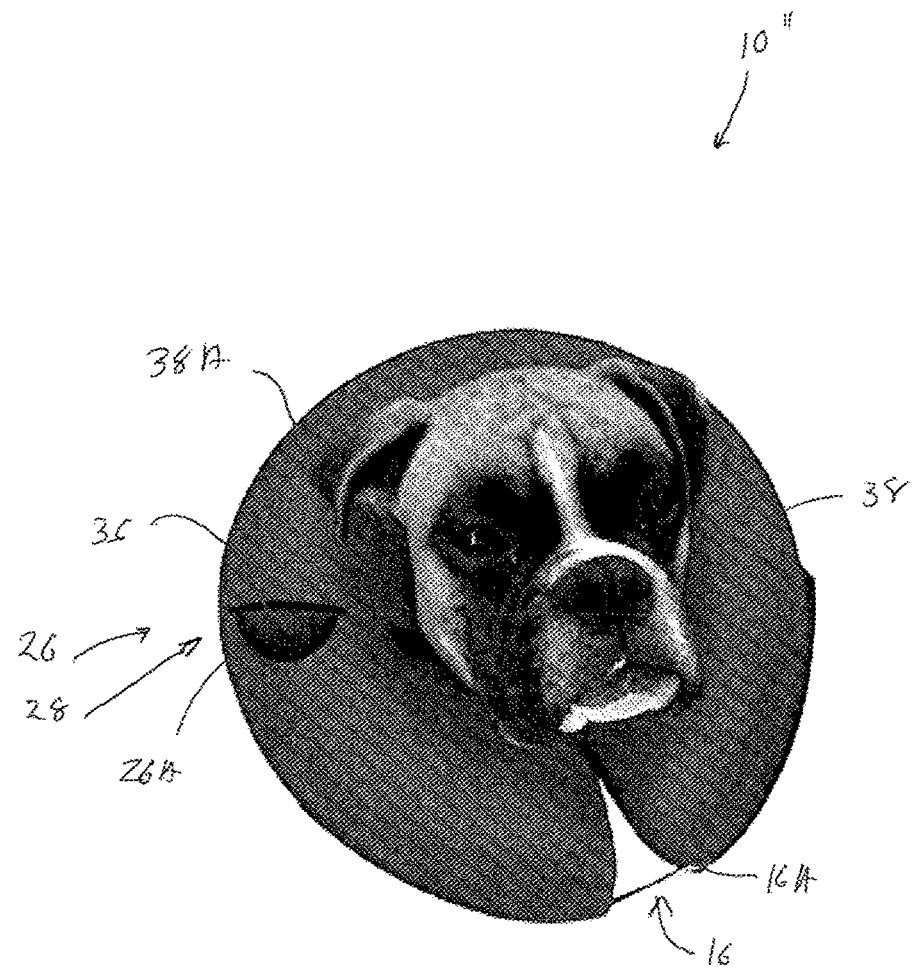
FIG. 4 is a diagram of an exemplary pet cone according to one aspect of the present application.

Referring to FIG. 4, another embodiment of the pet cone 10" may be seen. The pet cone 10" may be formed of a "U" shaped air bladder 38. The "U" shaped air bladder 38 may be formed of any type of lightweight material configured to be hold and store air/gas. In the present embodiment, a fabric material having a rubber liner may be used. The above is given as an example and should not be seen in a limiting manner A neck of an animal may be positioned within "U" shaped air bladder 38. The "U" shaped air bladder 38 is then secured around the animal's neck.

The "U" shaped air bladder 38 may have a securing mechanism 16 formed thereon. The securing mechanism 16 may allow one to secure and hold the pet cone 10" around the animal's neck. In accordance with one embodiment, the securing mechanism 16 may be a snap on strap 16A.

In the present embodiment, the pocket 26 may be formed by securing a mesh material 26A to a top exterior surface 38A of the "U" shaped air bladder 38. At least one side of the mesh material 26A may be removably secured to the exterior surface 38A. In accordance with one embodiment, a hook and loop material 36 may be used to removably secure at least one side of the mesh material 26A to the exterior surface 38A The remaining sides of the mesh material 26A may be permanently secured to the exterior surface 38A. The pocket 26 may prevent the animal from reaching the therapeutic delivery patch 28.

By disengaging the at least one side of the mesh material 26A that is removably secured to the exterior surface 38A, an individual may insert different therapeutic delivery patches 28 within the pocket 26 formed by the mesh material 26A. The mesh material 26A may provide air transfer capabilities to allow the animal to smell the contents of the therapeutic delivery patch 28.

The foregoing description is illustrative of particular embodiments of the invention, but is not meant to be a limitation upon the practice thereof. The following claims, including all equivalents thereof, are intended to define the scope of the invention.

What is claimed is:

1. A medical pet collar comprising:
   a cone structure for positioning around a neck of an animal, the cone structure preventing the animal from biting and licking a body of the animal; and
   a pocket formed on the cone structure, the pocket having at least one side that is removably coupled to the cone structure, the at least one side that is removably coupled to the cone structure allowing for different therapeutic delivery patches to be stored within the pocket, the pocket configured to provide air transfer capabilities to allow the animal to smell the contents of a therapeutic delivery patch stored within the pocket and to prevent the animal from reaching the therapeutic delivery patch.

2. The medical pet collar of claim 1 wherein the cone structure comprises:
   a semicircle piece;
   a semicircular cutout formed in a top central area of the semicircle piece, the semicircular cutout sized to allow a neck of the animal to be positioned within the semicircular cutout; and
   a securing mechanism coupled to the semicircle piece, the securing mechanism attaching the semicircle piece together to form a cone around the neck of the animal.

3. The medical pet collar of claim 2, wherein the securing mechanism is hook and loop material.

4. The medical pet collar of claim 2, wherein the securing mechanism comprises:
   a plurality of openings formed through the semicircle piece, the plurality of openings formed along a side edge of the semicircle piece; and
   a connector formed on an opposing side edge of the semicircle piece from the plurality of openings, the connector engaging with at least one of the openings securing the semicircle piece together forming the cone.

5. The medical pet collar of claim 4, wherein the plurality of openings comprises:
   a first pair of openings formed in an upper section of the semicircle piece; and
   a second pair of openings formed in a lower section of the semicircle piece;
   wherein the first pair of openings are aligned with the second pair of openings.

6. The medical pet collar of claim 2, wherein the pocket comprises:
   a plurality of ventilation holes formed through the semicircle piece;
   a cover plate formed over the ventilation holes, wherein at least one side of the cover plate is removably coupled to the collar allowing for different therapeutic delivery patches to be stored within the pocket, the plurality of ventilation holes providing air transfer capabilities to allow the animal to smell the contents of the therapeutic delivery patch stored within the packet.

7. The medical pet collar of claim 6, wherein the pocket comprises a pair of slots formed on opposing sides of the plurality of ventilation holes, opposing side edges of the cover plate inserted into a respective slot securing the cover plate to the semicircle piece forming the pocket.

8. The medical per collar of claim 1, wherein the collar comprises a "U" shaped air bladder.

9. The medical pet collar of claim 1, wherein the pocket comprises:
   a mesh material coupled to the cone structure, at least one side of the mesh material removably secured to the cone structure, remaining sides of the mesh material permanently secured to the cone structure.

* * * * *